(12) United States Patent
Gu et al.

(10) Patent No.: US 12,037,735 B2
(45) Date of Patent: Jul. 16, 2024

(54) ANTI LEAKAGE WATER INLET PIPE ASSEMBLY

(71) Applicant: Wuxi Jinhua Yiyuan Technology Co., Ltd., Wuxi (CN)

(72) Inventors: Niandong Gu, Wuxi (CN); Xiaojia Lu, Wuxi (CN)

(73) Assignee: WUXI JINHUA YIYUAN TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/173,281

(22) Filed: Feb. 23, 2023

(65) Prior Publication Data

US 2023/0193600 A1 Jun. 22, 2023

Related U.S. Application Data

(63) Continuation of application No. PCT/CN2022/133504, filed on Nov. 22, 2022.

(30) Foreign Application Priority Data

Sep. 9, 2022 (CN) .......................... 202222407516.0

(51) Int. Cl.
   D06F 39/08 (2006.01)
   A47L 15/42 (2006.01)
   E03C 1/02 (2006.01)
   F16L 25/00 (2006.01)

(52) U.S. Cl.
   CPC .......... *D06F 39/081* (2013.01); *A47L 15/421* (2013.01); *E03C 1/025* (2013.01); *F16L 25/0036* (2013.01); *E03C 2001/026* (2013.01)

(58) Field of Classification Search
   CPC .................. F16L 25/0036; E03C 1/025; E03C 2001/026; A47L 15/421; D06F 39/081; Y10T 137/5762
   See application file for complete search history.

(56) References Cited

U.S. PATENT DOCUMENTS

| | | | | |
|---|---|---|---|---|
| 3,779,273 A | * | 12/1973 | Stone | F16K 17/34 251/23 |
| 3,850,199 A | * | 11/1974 | Stone | D06F 39/081 137/460 |
| 5,771,916 A | * | 6/1998 | Armenia | F16K 17/363 137/67 |
| 6,446,661 B2 | * | 9/2002 | Armenia | F16L 39/02 285/123.1 |
| 9,464,725 B2 | * | 10/2016 | Bianchi | F16K 17/36 |

(Continued)

FOREIGN PATENT DOCUMENTS

| | | | |
|---|---|---|---|
| CN | 201268799 Y | * | 7/2009 |
| CN | 201268799 Y | | 7/2009 |
| CN | 103032614 A | | 4/2013 |

(Continued)

*Primary Examiner* — David Colon-Morales
(74) *Attorney, Agent, or Firm* — IPRO, PLLC

(57) ABSTRACT

An anti-leakage pipe assembly includes a valve body. The valve body is externally sleeved with a housing. A corrugated pipe is in the housing. One end of the valve body is sleeved with a second nut. The other end of the valve body is connected to an inner pipe. An end of the inner pipe distal from the valve body is connected to an elbow pipe. An end head of the elbow pipe is sleeved with a first nut.

8 Claims, 6 Drawing Sheets

(56) References Cited

U.S. PATENT DOCUMENTS 9,568,115 B2 * 2/2017 Bianchi ................ D06F 39/081
9,964,222 B1 * 5/2018 Jones ...................... F16K 17/36

FOREIGN PATENT DOCUMENTS

| CN | 103032614 | A | * | 4/2013 | |
|----|-----------|---|---|--------|---|
| CN | 203809892 | U |   | 9/2014 | |
| CN | 203809892 | U | * | 9/2014 | |
| CN | 105782611 | A |   | 7/2016 | |
| CN | 105782611 | A | * | 7/2016 | |
| CN | 205655009 | U |   | 10/2016 | |
| CN | 205655009 | U | * | 10/2016 | |
| CN | 109464107 | A | * | 3/2019 | ........... A47L 15/421 |
| CN | 211398582 | U |   | 9/2020 | |
| EP | 0859078 | A1 | * | 8/1998 | |
| EP | 2224051 | A1 | * | 9/2010 | ........... D06F 39/081 |
| EP | 2290152 | A1 | * | 3/2011 | ........... A47L 15/421 |
| EP | 2489298 | A1 | * | 8/2012 | ......... A47L 15/4217 |
| EP | 3553222 | A1 | * | 10/2019 | ......... D06F 39/081 |
| JP | H04160280 | A |   | 6/1992 | |
| KR | 20210001256 | U |   | 6/2021 | |
| WO | WO-2012140595 | A2 | * | 10/2012 | ............. A47L 15/42 |
| WO | WO-2014195014 | A2 | * | 12/2014 | ........... A47L 15/421 |
| WO | WO-2015008199 | A1 | * | 1/2015 | ........... A47L 15/421 |
| WO | WO-2020012517 | A1 | * | 1/2020 | ........... A47L 15/421 |
| WO | WO-2021210035 | A1 | * | 10/2021 | ........... A47L 15/421 |
| WO | WO-2022238920 | A1 | * | 11/2022 | ......... A47L 15/4217 |

\* cited by examiner

ANTI LEAKAGE WATER INLET PIPE ASSEMBLY

TECHNICAL FIELD

The present disclosure relates to an anti-leakage pipe assembly and belongs to the technical field of household appliances.

BACKGROUND

The existing water inlet pipes of household appliances such as washing machines and dishwashers are likely to leak water after being used for a long time, or even crack to cause water accumulation in rooms. This type of water pipes cannot achieve the function of self-locking of water. Once the water pipes crack or leak water, water flows cannot be stopped in time, and the water may be continuously leaked from the cracking position, resulting in waste of lots of water resources as well as water accumulation in rooms, and accordingly causing great economic loss of users. In addition, a nut used at a joint of an existing an anti-leakage water inlet pipe assembly and a device such as a washing machine and a dishwasher is riveted and buckled on a valve body of the anti-leakage water inlet pipe assembly. Such riveting manner causes low efficiency and high cost, and cannot meet the requirements of batch manufacturing of anti-leakage water inlet pipe assemblies.

SUMMARY

To solve the above technical problems, the present disclosure provides an anti-leakage water inlet pipe assembly. The anti-leakage water inlet pipe assembly can cut off water flows in time to effectively prevent water leakage when an inner pipe cracks. In addition, the nut used in connection of the anti-leakage water inlet pipe assembly with equipment such as a washing machine and a dishwasher are manually fastened to the valve body. The anti-leakage water inlet pipe assembly is simple in structure, convenient to operate, low in manufacturing cost, and capable of meeting the requirements of batch manufacturing thereof.

The anti-leakage water inlet pipe assembly includes a valve body, where the valve body is externally sleeved with a housing; a corrugated pipe is disposed in the housing; one end of the valve body is sleeved with a second nut; the other end of the valve body is connected to an inner pipe; one end, far away from the valve body, of the inner pipe is connected to an elbow pipe; and an end head of the elbow pipe is sleeved with a first nut.

In one embodiment of the present disclosure, the inner pipe is located inside the corrugated pipe, and a second chamber is disposed between the inner pipe and the corrugated pipe; the inner pipe is a hollow pipe; a central pressure bearing channel is disposed in the valve body; the central pressure bearing channel communicates with interior of the inner pipe; the interior of the inner pipe communicates with interior of the elbow pipe; a first chamber is disposed in the housing; and the first chamber communicates with the second chamber.

In one embodiment of the present disclosure, a valve element assembly is disposed in the central pressure bearing channel; the valve element assembly is movable in the central pressure bearing channel; one end of the valve element assembly is fixedly connected to a frame; expansion cotton is disposed in the frame; the expansion cotton communicates with the first chamber; the frame is disposed at one end of the expansion cotton; and a base is disposed at the other end of the expansion cotton.

In one embodiment of the present disclosure, a flow splitting filter screen is connected to interior of one end, close to the second nut, of the valve body; the flow splitting filter screen includes a filter screen and a splitter plate that is disposed on the filter screen; a plurality of support ribs are disposed at an outer side of the flow splitting filter screen; a base plate is disposed at a bottom of the flow splitting filter screen; a gap is provided between the base plate and an inner wall of the valve body; and a water flow permeates through the flow splitting filter screen after being split by the splitter plate, and flows into the central pressure bearing channel via the gap between the base plate and the inner wall of the valve body.

In one embodiment of the present disclosure, an aluminum sealing pipe is further disposed between the valve body and the inner pipe; the elbow pipe is connected to the corrugated pipe by using a clamp hoop and a buckle; another aluminum sealing pipe is disposed between the elbow pipe and the inner pipe; an elbow sealing sleeve is disposed between the elbow pipe and the corrugated pipe; one side, close to the housing, of the elbow sealing sleeve is provided with an elbow sealing ring bevel; and another side, close to the inner pipe, of the elbow pipe is provided with a slope.

In one embodiment of the present disclosure, an elbow gasket is disposed in the first nut; an end portion of the elbow pipe is provided with a notch; and the elbow gasket is embedded into the notch.

In one embodiment of the present disclosure, the valve body is provided with a groove; a first sealing ring is embedded between the housing and the groove of the valve body; the valve element assembly is externally sleeved with a second sealing ring; and a bevel is disposed in the valve body.

In one embodiment of the present disclosure, the second nut is clamped on the valve body; a rubber gasket is disposed in the second nut; the rubber gasket abuts against a side end disk surface of the valve body; an inner buckle is further disposed in the second nut; the inner buckle is located between the second nut and the valve body and abuts against the valve body; a step is disposed in the second nut; and the inner buckle matches with the step.

In one embodiment of the present disclosure, the second nut and the inner buckle are made of plastic.

In one embodiment of the present disclosure, a sealing sleeve is disposed between the housing and the corrugated pipe; a sight glass is disposed at a bottom end of the housing; and a sight glass sealing ring is disposed between the sight glass and the housing.

Beneficial Effects

1. The anti-leakage water inlet pipe assembly provided by the present disclosure can cut off water flows in time to effectively prevent water leakage when the inner pipe cracks. In addition, the nut used in connection of the anti-leakage water inlet pipe assembly with equipment such as a washing machine and a dishwasher are manually fastened to the valve body. The anti-leakage water inlet pipe assembly is simple in structure, convenient to operate, low in manufacturing cost, and capable of meeting the requirements of batch manufacturing thereof.

2. When the valve element assembly in the present disclosure moves rightwards, the second sealing ring contacts and seals with the bevel in the valve body so as to cut off the communication between the central pressure bearing channel and the water tap assembly, thereby cutting off water flows to prevent water leakage.

3. The aluminum sealing pipe in the present disclosure achieves tighter connection between the valve body and the inner pipe, thereby preventing water leakage in the inner pipe.

4. In the present disclosure, the first sealing ring is disposed between the housing and the valve body and is configured to seal the first chamber so as to prevent water leakage in the first chamber; and the sealing sleeve is disposed between the housing and the corrugated pipe and is configured to seal the first chamber so as to prevent water leakage in the first chamber.

5. In the present disclosure, the expansion cotton expands after absorbing water, and the frame moves rightwards. The frame is red in color, so the sight glass shows a color of red when seen outside the valve body. However, a normal sight glass is transparent; therefore, the red color indicates that the anti-leakage water inlet pipe assembly enters a self-locked state. In this case, a new water pipe is required for replacement. The anti-leakage water inlet pipe assembly is practical, simple, convenient to operate, and capable of reminding a user of replacing the water pipe in time.

6. The flow splitting filter screen in the present disclosure is configured to guide a water flow to flow from a side of the valve element assembly so as to prevent the water flow from directly impacting the valve element assembly therebelow and triggering self-locking of a water inlet pipe assembly. The support ribs provided can prevent deformation of the flow splitting filter screen, namely prevent deformation caused by extrusion of the filter screen when the flow splitting filter screen is ejected out of a mold because a plastic material of the flow splitting filter screen is soft before cooled completely.

7. The second nut in the present disclosure is internally provided with a step, and the inner buckle matches with the step. After the second nut sleeves the inner buckle, the step disposed in the second nut enables the inner buckle to be unfolded so that the inner buckle cannot be removed from the second nut. After the rubber gasket is installed, the inner buckle is fixed on the step and cannot slide downwards, and this also prevents a risk that the inner buckle falls out. The inner buckle and the second nut are both made of plastic. A plastic member may shrink inwards after being removed from a mold, therefore the inner buckle is set in a C shape, and the diameter of the inner buckle will be increased in design, so that the inner buckle reaches a required size after shrinkage. The inner buckle is installed on the valve body and is manually buckled by the second nut.

Figure 1:
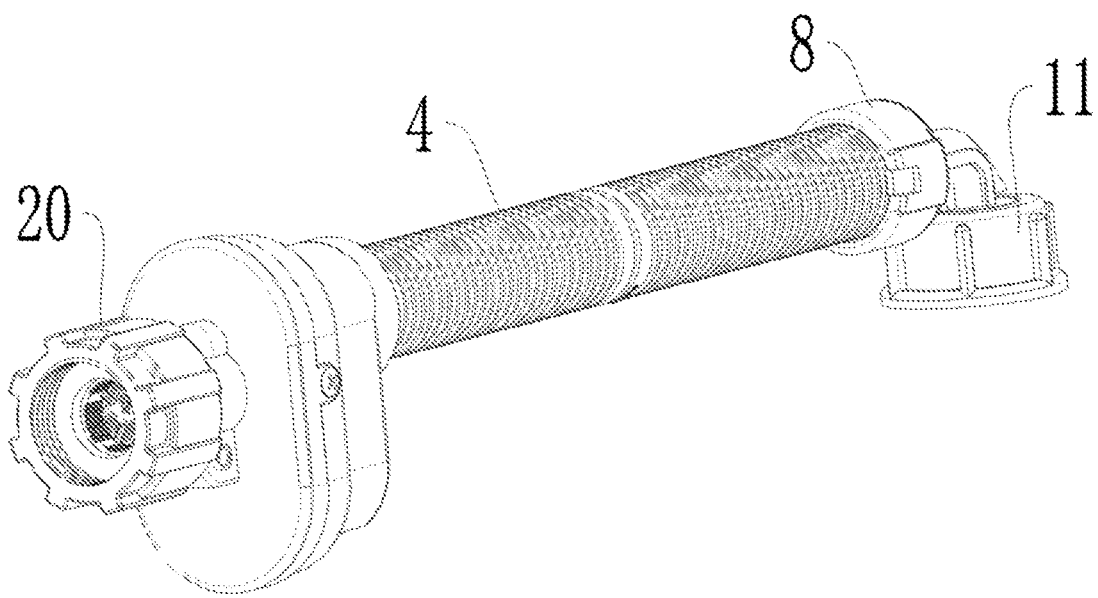
FIG. 1 is a three-dimensional diagram of an anti-leakage water inlet pipe assembly in the present disclosure.
Figure 2:
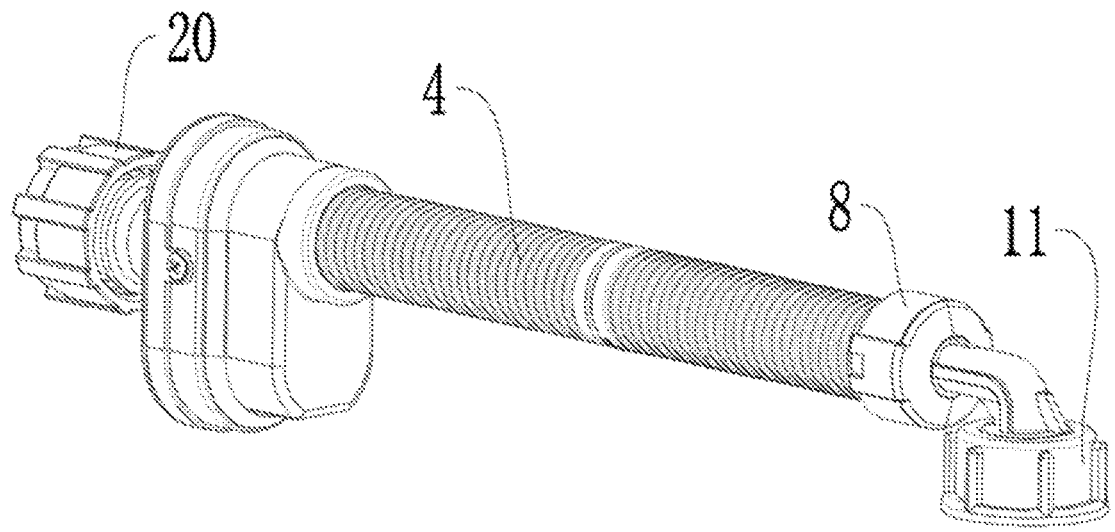
FIG. 2 is a three-dimensional diagram of the anti-leakage water inlet pipe assembly in the present disclosure from another angle of view.

In the figures, 1—valve body; 2—housing; 3—first sealing ring; 4—corrugated pipe; 5—inner pipe; 6—sealing sleeve; 7—aluminum sealing pipe; 8—clamp hoop; 9—buckle; 10—elbow pipe; 11—first nut; 12—elbow gasket; 13—sight glass; 14—sight glass sealing ring; 15—expansion cotton; 16—base; 17—frame; 18—valve element assembly; 19—rubber gasket; 20—second nut; 21—second sealing ring; 22—central pressure bearing channel; 23—first chamber; 24—second chamber; 25—bevel; 26—elbow sealing sleeve; 27—notch; 28—inner buckle; 29—flow splitting filter screen; 291—splitter plate; 292—filter screen; 293—support rib; 294—base plate; 30—step; 31—slope; 32—elbow sealing ring bevel; and 33—groove.

DETAILED DESCRIPTION

The following further describes the present disclosure in detail with reference to the accompanying drawings and examples. It should be understood that the specific examples described herein are merely intended to interpret the present disclosure rather than to limit the present disclosure. It should be further noted that for ease of description, the accompanying drawings merely illustrate the parts related to the present disclosure rather than all structures.

In the description of the present disclosure, unless otherwise specified and defined explicitly, the terms "link", "connect", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, internal communication between two elements, or an interaction between two elements. A person of ordinary skill in the art can understand specific meanings of the above terms in the present disclosure based on specific situations.

In the present disclosure, unless otherwise specified and defined explicitly, a first feature being "above" or "below" a second feature may mean that the first feature and the second feature are in direct contact, or mean that the first feature and the second feature are not in direct contact but are in contact via another feature therebetween. In addition, a first feature being "over", "above" or "on" a second feature may mean that the first feature is over or obliquely over the second feature, or merely means that the first feature has a larger horizontal height than the second feature. A first feature being "under", "below" or "beneath" a second feature may mean that the first feature is under or obliquely under the second feature, or merely means that the first feature has a smaller horizontal height than the second feature.

In the description of the present disclosure, the terms "above", "below", "left" and "left" are orientations or positional relationships as shown in the accompanying drawings. These terms are merely for ease and brevity of description of operations rather than indicating or implying that the apparatuses or components mentioned must have specific orientations or must be constructed or manipulated in specific orientations, and therefore cannot be construed as a limitation to the present disclosure. In addition, the terms "first" and "second" are merely used to distinguish between descriptions, and do not have specific meanings.

Example 1

Figure 3:
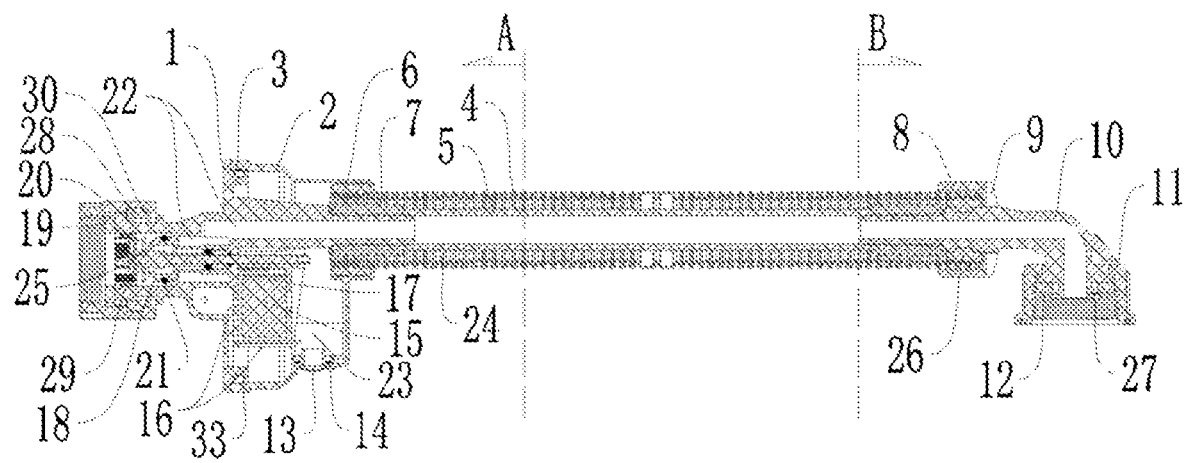
FIG. 3 is a cross-sectional view of the anti-leakage water inlet pipe assembly of the present disclosure.
Figure 4:
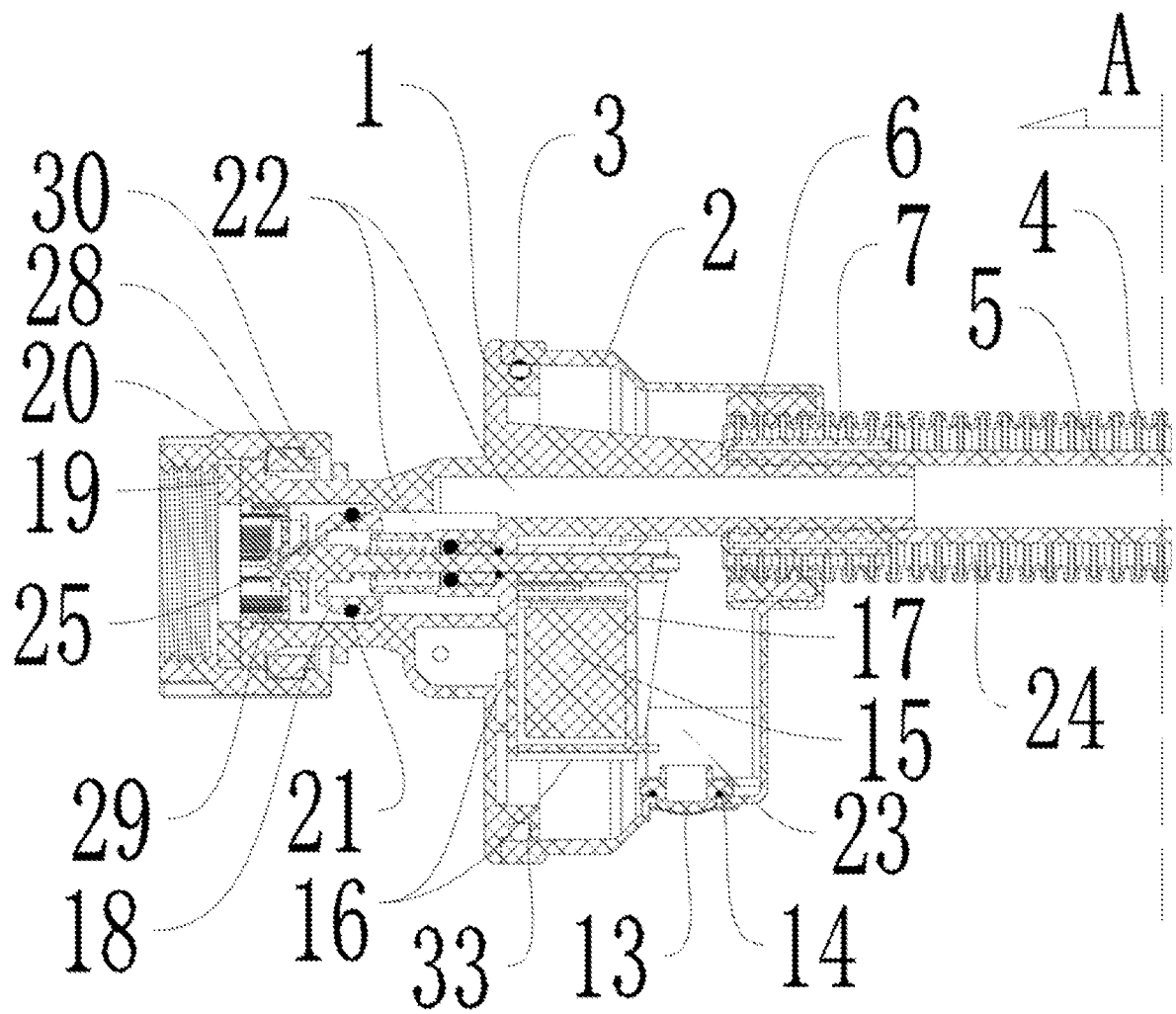
FIG. 4 is an enlarged view of a direction A in FIG. 3.
Figure 5:
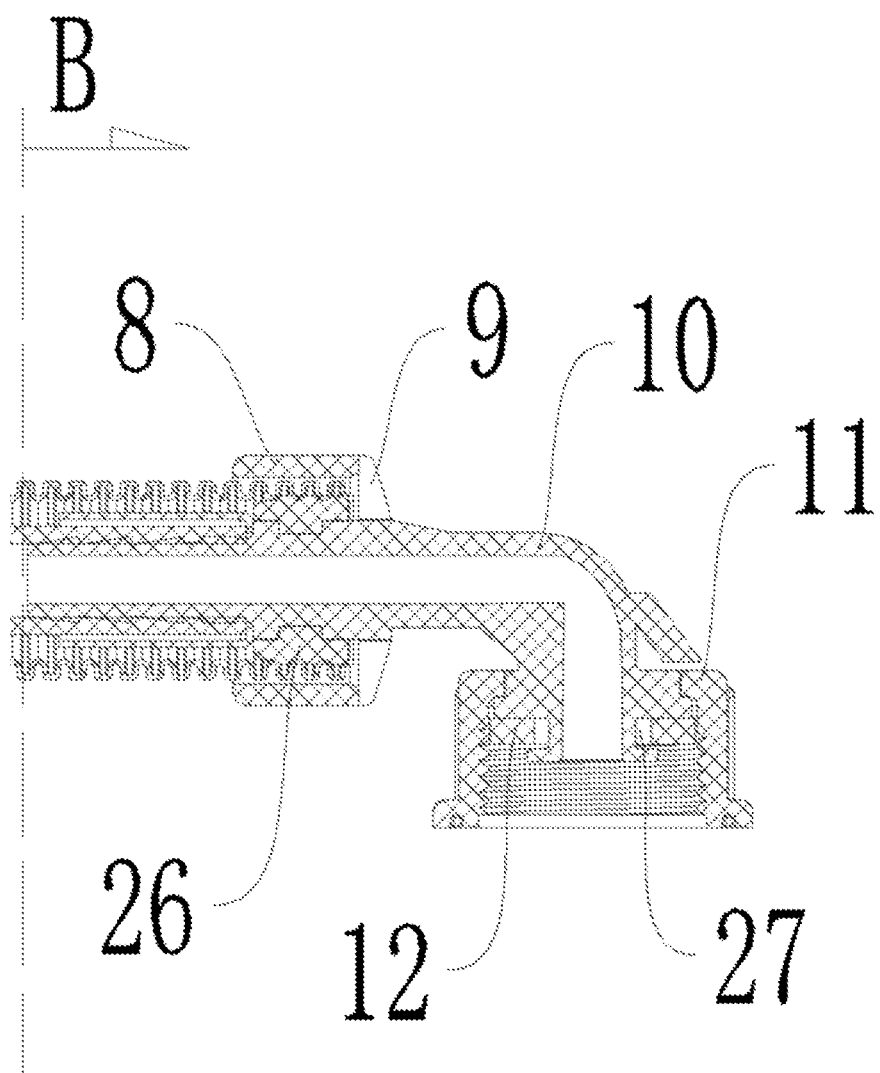
FIG. 5 is an enlarged view of a direction B in FIG. 3.
Figure 6:
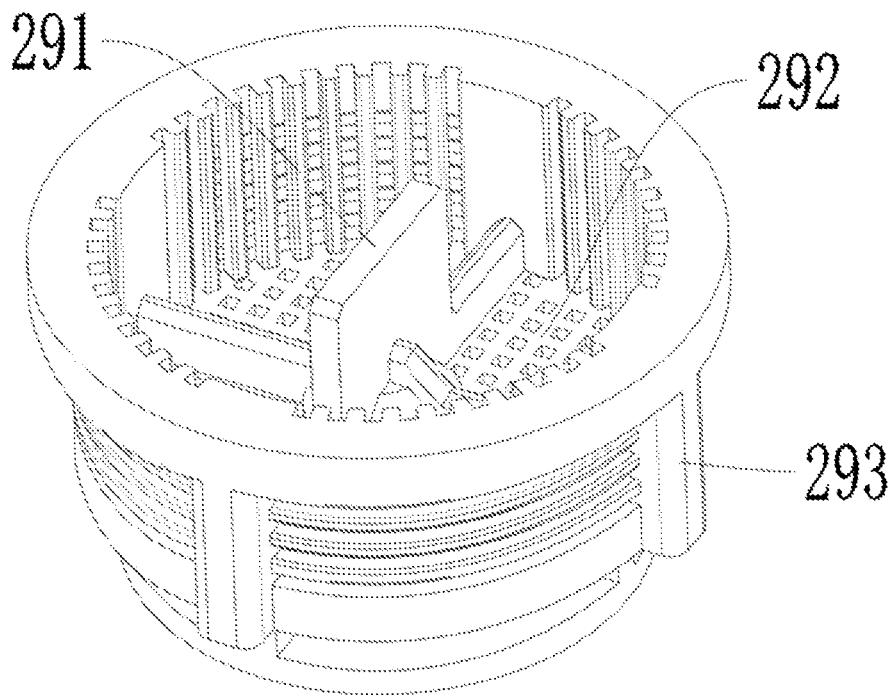
FIG. 6 is a three-dimensional diagram of a flow splitting filter screen in the present disclosure from one angle of view.
Figure 7:
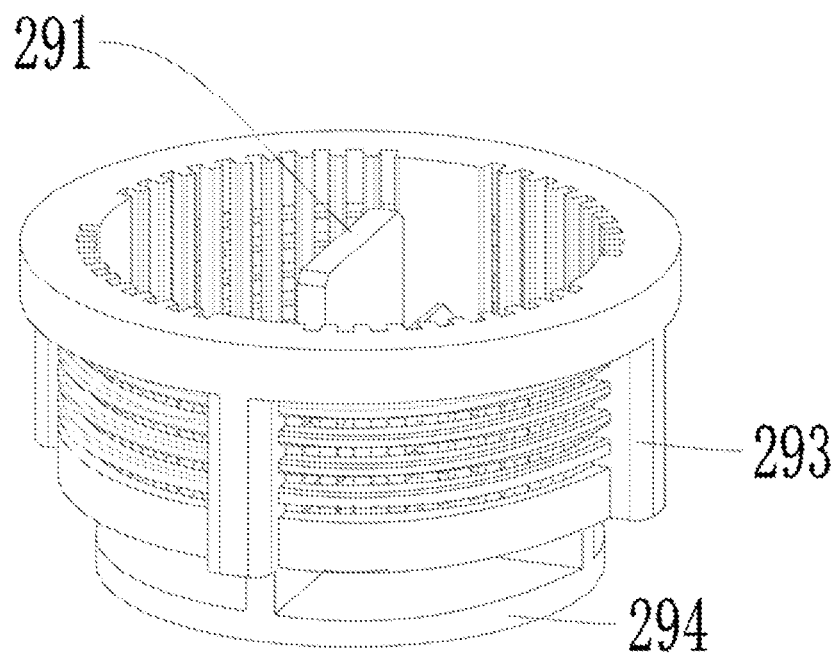
FIG. 7 is a three-dimensional diagram of the flow splitting filter screen in the present disclosure from another angle of view.
Figure 8:
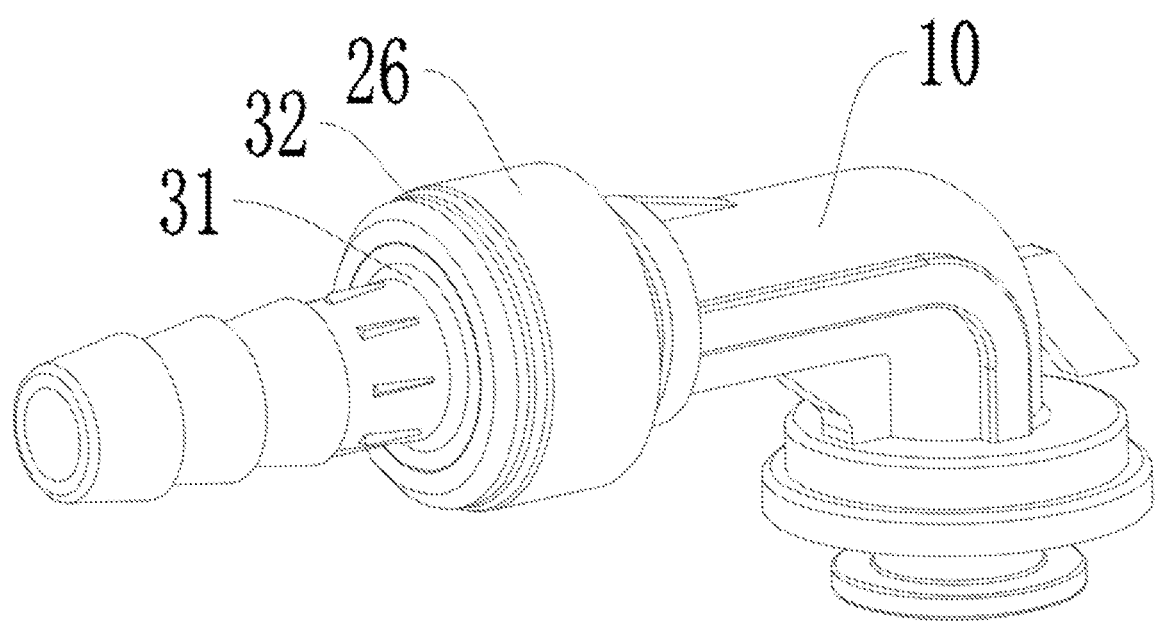
FIG. 8 is a three-dimensional diagram of an elbow pipe and an elbow sealing sleeve in the present disclosure.

As shown in FIGS. 1-8, an anti-leakage water inlet pipe assembly includes a valve body 1, where the valve body 1 is externally sleeved with a housing 2; a corrugated pipe 4 is disposed in the housing 2; one end of the valve body 1 is sleeved with a second nut 20; the other end of the valve body is connected to an inner pipe 5; one end, far away from the valve body 1, of the inner pipe 5 is connected to an elbow pipe 10; an end head of the elbow pipe 10 is sleeved with a first nut 11; the inner pipe 5 is located inside the corrugated pipe 4, and a second chamber 24 is disposed between the inner pipe and the corrugated pipe 4; the inner pipe 5 is a PVC pipe; a central pressure bearing channel 22 is disposed in the valve body 1; the central pressure bearing channel 22 communicates with interior of the inner pipe 5; the interior of the inner pipe 5 communicates with interior of the elbow pipe 10; a first chamber 23 is disposed in the housing 2; and the first chamber 23 communicates with the second chamber 24. The second nut 20 and a water tap assembly are assembled; the elbow pipe 10 and the first nut 11 are assembled on a washing machine; and as shown in FIG. 3 or FIG. 4, a water flow flows from left to right when the anti-leakage water inlet pipe assembly works normally.

Further, a valve element assembly 18 is disposed in the central pressure bearing channel 22; the valve element assembly 18 is movable in the central pressure bearing channel 22; one end of the valve element assembly 18 is fixedly connected to a frame 17; expansion cotton 15 is disposed in the frame 17; the expansion cotton 15 communicates with the first chamber 23; the frame 17 is disposed at one end of the expansion cotton 15; and a base 16 is disposed at the other end of the expansion cotton. When water is fed into the second chamber 23, the expansion cotton 15 in communication with the first chamber 23 absorbs water and expands; one end of the expanding expansion cotton 15 abuts against the base 16, and the other end of the expansion cotton abuts against the frame 17, so that the base 16 and the frame 17 move relatively. In this way, the frame 17 moves rightwards, and accordingly the valve element assembly 18 fixedly connected to the frame 17 is enabled to move rightwards.

Further, the valve element assembly 18 is externally sleeved with a second sealing ring 21; a bevel 25 is disposed in the valve body 1; when the valve element assembly 18 moves rightwards, the second sealing ring 21 contacts and seals with the bevel 25 in the valve body 1 so as to cut off the communication between the central pressure bearing channel 22 and the water tap assembly, thereby cutting off water flows to prevent water leakage.

Further, a flow splitting filter screen 29 is connected to interior of one end of the valve body 1 close to the second nut 20; the flow splitting filter screen 29 includes a filter screen 292 and a splitter plate 291 that is disposed on the filter screen 292; a plurality of support ribs 293 are disposed at an outer side of the flow splitting filter screen 29; a base plate 294 is disposed at a bottom of the flow splitting filter screen 29; a gap is provided between the base plate 294 and an inner wall of the valve body 1; and a water flow permeates through the flow splitting filter screen 29 after being split by the splitter plate 291, and flows into the central pressure bearing channel 22 via the gap between the base plate 294 and the inner wall of the valve body 1. The flow splitting filter screen 29 is configured to guide a water flow to flow through a side of the valve element assembly 18 so as to prevent the water flow from directly impacting the valve element assembly 18 therebelow and triggering self-locking of a water inlet pipe assembly. The support ribs 293 provided can prevent deformation of the flow splitting filter screen 29, namely prevent deformation caused by extrusion of the filter screen 292 when the flow splitting filter screen 29 is ejected out of a mold because a plastic material of the flow splitting filter screen 29 is soft before cooled completely.

Further, an aluminum sealing pipe 7 is further disposed between the valve body 1 and the inner pipe 5, and the aluminum sealing pipe 7 achieves tighter connection between the valve body 1 and the inner pipe 5, thereby preventing water leakage in the inner pipe 5.

Further, the elbow pipe 10 is connected to the corrugated pipe 4 by using a clamp hoop 8 and a buckle 9; another aluminum sealing pipe 7 is disposed between the elbow pipe 10 and the inner pipe 5; an elbow sealing sleeve 26 is disposed between the elbow pipe 10 and the corrugated pipe 4; one side, close to the housing 2, of the elbow sealing sleeve 26 is provided with an elbow sealing ring bevel 32; and another side, close to the inner pipe 5, of the elbow pipe 10 is provided with a slope 31. After being sleeved with the elbow sealing sleeve 26, the elbow pipe 10 is inserted into the corrugated pipe 4, and the elbow sealing sleeve 26 plays a role of sealing the elbow pipe 10 and the corrugated pipe 4. An elbow sealing ring bevel 32 provided enables the elbow sealing sleeve 26 to be easily inserted into the corrugated pipe 4, so that the elbow sealing sleeve 26 achieves a tight sealing effect to prevent water leakage. A slope 31 provided on the elbow pipe 10 and having a bevel and a round corner can increase wall thickness of a tail of the elbow pipe 10, thereby enhancing strength, increasing a force required for resisting rupture, and preventing occurrence of rupture.

Further, an elbow gasket 12 is disposed in the first nut 11; an end portion of the elbow pipe 10 is provided with a notch 27; and the elbow gasket 12 is embedded into the notch 27. The end portion of the elbow pipe 10 is installed into the first nut 11 after sleeved with the elbow gasket 12, and the elbow gasket 12 is clamped by the notch 27 so as to prevent falling off.

Further, the valve body 1 is provided with a groove 33; a first sealing ring 3 is embedded between the housing 2 and the groove 33 of the valve body 1; and the first sealing ring 3 is configured to seal the first chamber 23 so as to prevent water leakage in the first chamber 23. After the valve body 1 and the housing 2 are installed in place, the first sealing ring 3 can play a sealing role. The groove 33 provided can effectively prevent the first sealing ring 3 from being rushed out under a high internal water pressure, so that a pressure for rushing the first sealing ring 3 out of the housing 2 is increased, thereby effectively preventing the first sealing ring 3 from dropping out.

Further, the second nut 20 is clamped on the valve body 1; a rubber gasket 19 is disposed in the second nut 20; the rubber gasket 19 abuts against a side end disk surface of the valve body 1; an inner buckle 28 is further disposed in the second nut 20; the inner buckle 28 is located between the second nut 20 and the valve body 1 and abuts against the valve body 1; a step 30 is disposed in the second nut 20; and the inner buckle 28 matches with the step 30. The inner buckle 28 is configured to connect the second nut 20 to the valve body 1. After buckling, the inner buckle 28 prevents the second nut 20 from falling off. After the second nut 20 sleeves the inner buckle 28, the step 30 disposed in the second nut 20 enables the inner buckle 28 to be unfolded so that the inner buckle cannot be removed from the second nut 20. After the rubber gasket 19 is installed, the inner buckle 28 is fixed on the step 30 and cannot slide downwards, and this also prevents a risk that the inner buckle 28 falls out. Optionally, the inner buckle 28 and the second nut 20 are both made of plastic. A plastic member may shrink inwards after being removed from a mold, therefore the inner buckle 28 is set in a C shape, and the diameter of the inner buckle 28 will be increased in design, so that the inner buckle 28 reaches a required size after shrinkage. The inner buckle 28 is installed on the valve body 1 and is manually buckled by the second nut 10.

Further, a sealing sleeve 6 is disposed between the housing 2 and the corrugated pipe 4, and the sealing sleeve 6 is configured to seal the first chamber 23 so as to prevent leakage of water entering the first chamber 23.

Further, a sight glass 13 is disposed at a bottom end of the housing 2; and a sight glass sealing ring 14 is disposed between the sight glass 13 and the housing 2.

An operating principle of the present disclosure is that: the second nut 20 and a water tap assembly are assembled, and the elbow pipe 10 and the first nut 11 are assembled on a washing machine. When a water tap is opened through twisting and water flows into the valve body 1, the water flows into the inner pipe 5 via the gap, namely the central pressure bearing channel 22 between the valve element assembly 18 and the inner wall of the valve body 1, and then enters the washing machine via the inner pipe 5 and the elbow pipe 10.

If the inner pipe 5 cracks, water may flow into an interlayer, namely the second chamber 24 between the inner pipe 5 and the corrugated pipe 4. The water in the second chamber 24 flows into the first chamber 23, the expansion cotton 15 in communication with the first chamber 23 absorbs water and expands. One end of the expanding expansion cotton 15 abuts against the base 16, and the other end of the expansion cotton abuts against the frame 17, so that the base 16 and the frame 17 move relatively. In this way, the frame 17 moves rightwards, and accordingly the valve element assembly 18 fixedly connected to the frame 17 is enabled to move rightwards. When the valve element assembly 18 moves rightwards, the second sealing ring 21 contacts and seals with the bevel 25 in the valve body 1 so as to cut off the communication between the central pressure bearing channel 22 and the water tap assembly, thereby cutting off water flows to prevent water leakage. In addition, the expansion cotton 15 expands after absorbing water, and the frame 17 moves rightwards. The frame 17 is red in color, so the sight glass 13 shows a color of red when seen outside the valve body 1. However, a normal sight glass is transparent; therefore, the red color indicates that the anti-leakage water inlet pipe assembly enters a self-locked state. In this case, a new water pipe is required for replacement.

The protection scope of the present disclosure is not limited to the forgoing examples. Any modification, equivalent substitution and improvement that can be made by a person skilled in the art without departing from the spirit and principle of the concept of the present disclosure shall fall within the protection scope of the present disclosure.

What is claimed is:

1. A pipe assembly, comprising:
   a valve body, wherein the valve body is externally sleeved with a housing;
   a corrugated pipe in the housing;
   wherein one end of the valve body is sleeved with a second nut;
   wherein the other end of the valve body is connected to an inner pipe;
   wherein an end of the inner pipe distal from the valve body is connected to an elbow pipe;
   wherein an end head of the elbow pipe is sleeved with a first nut;
   wherein the inner pipe is inside the corrugated pipe, and a second chamber is between the inner pipe and the corrugated pipe;
   wherein the inner pipe is a hollow pipe;
   wherein a central pressure bearing channel is in the valve body;
   wherein the central pressure bearing channel communicates with an interior of the inner pipe;
   wherein the interior of the inner pipe communicates with an interior of the elbow pipe;
   wherein a first chamber is in the housing;
   wherein the first chamber communicates with the second chamber;
   wherein a flow splitting filter screen is connected to an interior of one end of the valve body proximal to the second nut;
   wherein the flow splitting filter screen comprises a filter screen and a splitter plate on the filter screen;
   wherein a plurality of support ribs are at an outer side of the flow splitting filter screen;
   wherein a base plate is at a bottom of the flow splitting filter screen;
   wherein a gap is provided between the base plate and an inner wall of the valve body; and
   wherein a water flow permeates through the flow splitting filter screen after being split by the splitter plate, and flows into the central pressure bearing channel via the gap between the base plate and the inner wall of the valve body.

2. The pipe assembly according to claim 1,
   wherein a valve element assembly is in the central pressure bearing channel;
   wherein the valve element assembly is movable in the central pressure bearing channel;
   wherein one end of the valve element assembly is fixedly connected to a frame;
   wherein expansion cotton is in the frame;
   wherein the expansion cotton communicates with the first chamber;
   wherein the frame is at one end of the expansion cotton; and
   wherein a base is at the other end of the expansion cotton.

3. The pipe assembly according to claim 1, wherein an aluminum sealing pipe is further between the valve body and the inner pipe;
   wherein the elbow pipe is connected to the corrugated pipe by using a clamp hoop and a buckle;
   wherein another aluminum sealing pipe is between the elbow pipe and the inner pipe;
   wherein an elbow sealing sleeve is between the elbow pipe and the corrugated pipe;
   wherein one side, close to the housing, of the elbow sealing sleeve is provided with an elbow sealing ring bevel; and
   wherein another side, close to the inner pipe, of the elbow pipe is provided with a slope.

4. The pipe assembly according to claim 3, wherein an elbow gasket is in the first nut;
   wherein an end portion of the elbow pipe is provided with a notch; and
   wherein the elbow gasket is embedded into the notch.

5. The pipe assembly according to claim 4, wherein the valve body is provided with a groove;

wherein a first sealing ring is embedded between the housing and the groove of the valve body;

wherein a valve element assembly is in the central pressure bearing channel and the valve element assembly is externally sleeved with a second sealing ring; and wherein a bevel is in the valve body.

6. The pipe assembly according to claim 5, wherein the second nut is clamped on the valve body;

wherein a gasket is in the second nut;

wherein the gasket abuts against a side end disk surface of the valve body;

wherein an inner buckle is further in the second nut;

wherein the inner buckle is between the second nut and the valve body, and abuts against the valve body;

wherein a step is in the second nut; and wherein the inner buckle matches with the step.

7. The pipe assembly according to claim 6, wherein the second nut and the inner buckle are made of plastic.

8. The pipe assembly according to claim 7, wherein a sealing sleeve is between the housing and the corrugated pipe;

wherein a sight glass is at a bottom end of the housing; and wherein a sight glass sealing ring is between the sight glass and the housing.

* * * * *